March 6, 1962 D. L. MARTIN 3,024,420

DIGITAL PHASE-PULSE DETECTOR

Filed Sept. 9, 1959 9 Sheets-Sheet 1

INVENTOR.
DONALD L. MARTIN
BY Moody and Goldman
ATTORNEYS

March 6, 1962 D. L. MARTIN 3,024,420
DIGITAL PHASE-PULSE DETECTOR
Filed Sept. 9, 1959 9 Sheets-Sheet 2
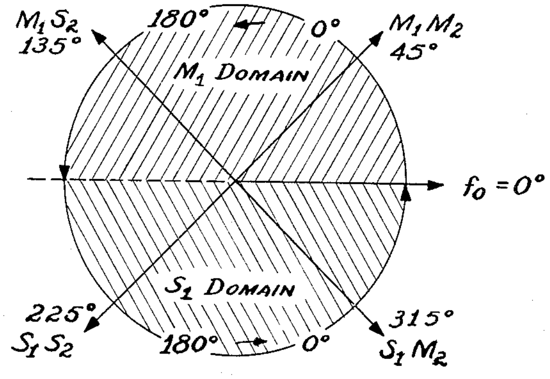
FIG 2[A]
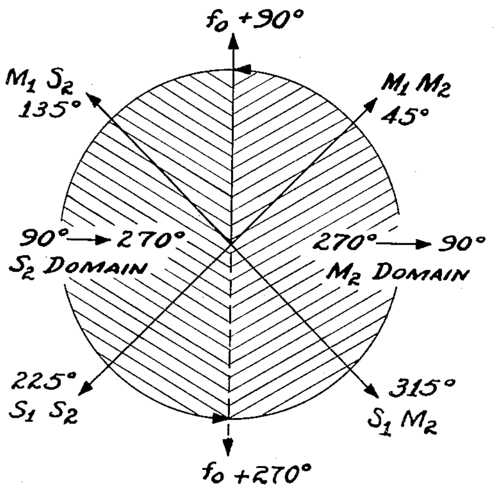
FIG 2[B]
INVENTOR.
DONALD L. MARTIN
BY Moody and Goldman
ATTORNEYS March 6, 1962 D. L. MARTIN 3,024,420

DIGITAL PHASE-PULSE DETECTOR

Filed Sept. 9, 1959 9 Sheets-Sheet 3

INVENTOR.
DONALD L. MARTIN
BY Moody and Goldman
ATTORNEYS

March 6, 1962 D. L. MARTIN 3,024,420

DIGITAL PHASE-PULSE DETECTOR

Filed Sept. 9, 1959 9 Sheets-Sheet 4

INVENTOR.
DONALD L. MARTIN
BY Moody and Goldman
ATTORNEYS

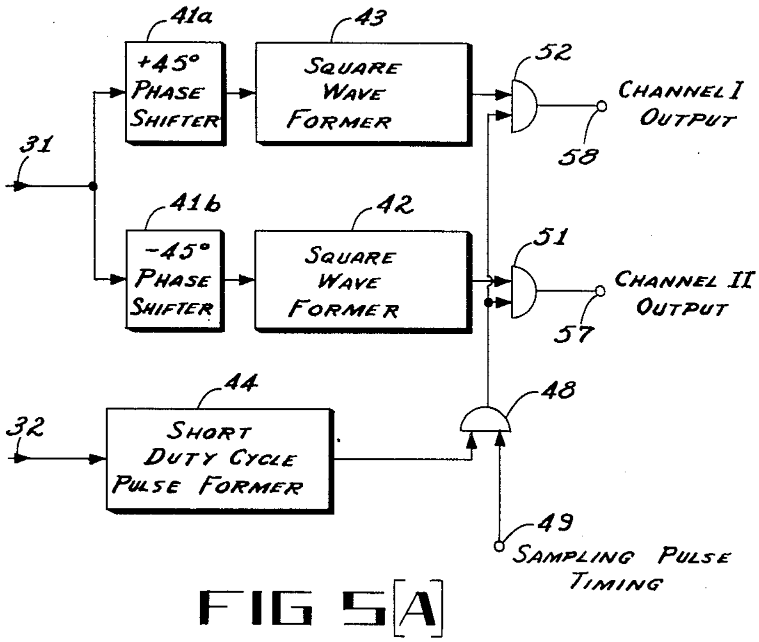
FIG 5[A]
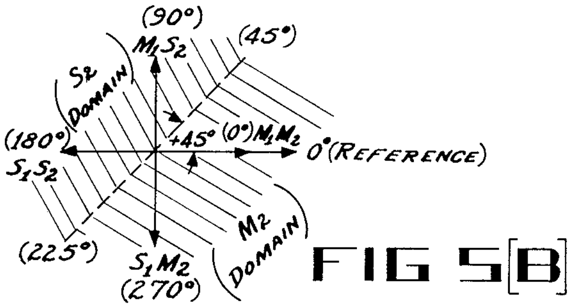
FIG 5[B]
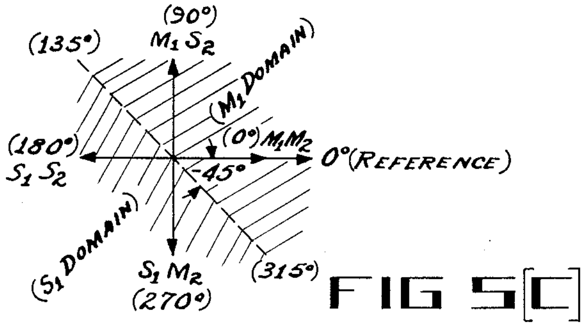
FIG 5[C]
INVENTOR.
DONALD L. MARTIN
BY Moody and Goldman
ATTORNEYS INVENTOR.
DONALD L. MARTIN
BY Woodward Goldman
ATTORNEYS March 6, 1962 D. L. MARTIN 3,024,420

DIGITAL PHASE-PULSE DETECTOR

Filed Sept. 9, 1959 9 Sheets-Sheet 7

INVENTOR.
DONALD L. MARTIN
BY Mooty and Goldman
ATTORNEYS

March 6, 1962 D. L. MARTIN 3,024,420

DIGITAL PHASE-PULSE DETECTOR

Filed Sept. 9, 1959 9 Sheets-Sheet 8

INVENTOR.
DONALD L. MARTIN
BY Moody and Goldman
ATTORNEYS

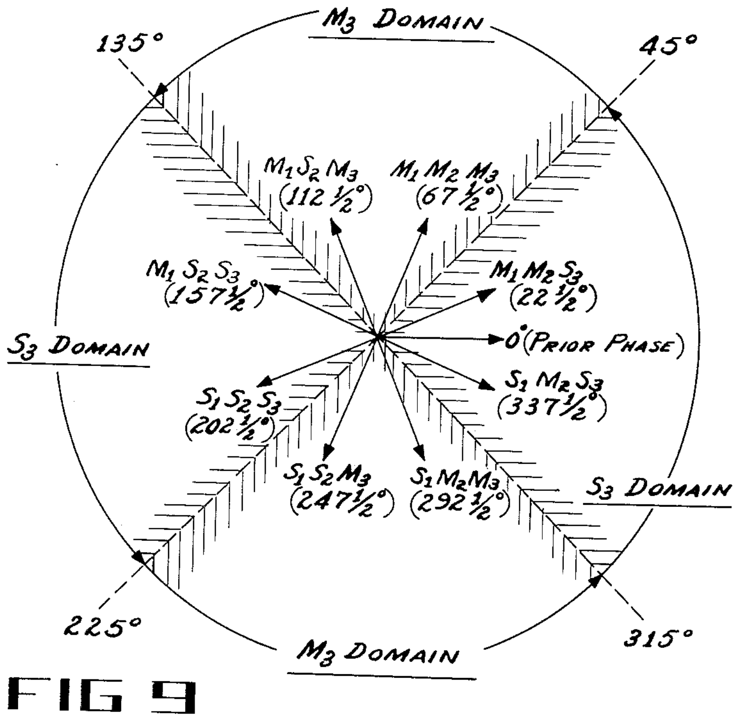
FIG 9
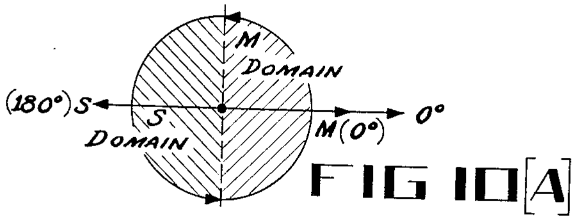
FIG 10[A]
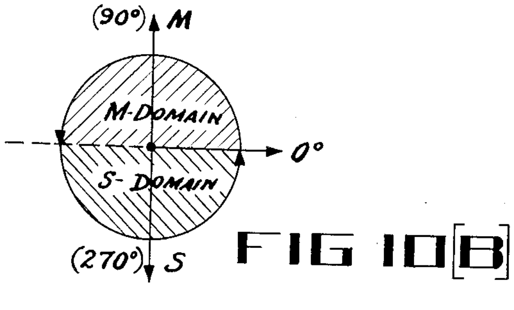
FIG 10[B]
INVENTOR.
DONALD L. MARTIN
BY Moody and Goldman
ATTORNEYS

3,024,420
DIGITAL PHASE-PULSE DETECTOR

Donald L. Martin, Northridge, Calif., assignor to Collins Radio Company, Cedar Rapids, Iowa, a corporation of Iowa Filed Sept. 9, 1959, Ser. No. 838,960
15 Claims. (Cl. 329—104)

This invention relates to detectors of phase-pulsed information; which can be generated by modulators, such as those given in the following applications and patents (all assigned to the same assignee as the present application): Patent No. 2,676,245 entitled "Polar Communication System" by Melvin Doelz, issued April 20, 1954, Patent No. 2,833,917 entitled, "Locking Oscillator Phase-Pulse Generator" by Dean F. Babcock, issued May 6, 1958; Patent Application Serial No. 716,206 entitled "Data Phase Coding System" by Frank Delaney, filed February 19, 1958; Patent Application Serial No. 626,493 entitled "Phase-Pulse Generator" by George Barry, filed December 5, 1956; Patent No. 2,870,431, entitled, "Matrix Controlled Phase-Pulse Generator" by Dean F. Babcock filed January 8, 1957; and Patent Application Serial No. 502, 045, entitled, "High Speed Transmission of Messages" by Melvin L. Doelz and Dean F. Babcock, filed April 18, 1955, now Patent No. 2,905,812, issued September 22, 1959.

A phase-pulse modulator can simultaneously modulate a number of binary channels onto a subcarrier frequency. In accomplishing its modulation function, it has a choice of $2^n$ discrete phase-shifts. The discrete modulation chooses specific phase-shifts by a coding between them.

The coding assigns to each of the $2^n$ phase-shifts one information bit from each of the $n$ channels. Thus, each phase-shift carries $n$ bits of information. The term "phase-pulse" is used herein to define the period of substantially constant phase that is maintained between phase-shifts.

Another digital phase-pulse demodulator is taught in patent application Serial No. 769,456, filed October 24, 1958, entitled, "Digital Phase-Pulse Demodulator" by Frank Secretan, and assigned to the same assignee as the present application. The Secretan demodulator uses the resetting operation of a chain of bistable circuits being driven with the phase of a prior phase-pulse. The resetting is done by a pulse having a timing derived from the phase of each new phase-pulse. The output of the chain of bistable circuits is sensed at the instant of reset. The resetting operation demodulates the phase-shift between phase-pulses by detecting the direction of reset for the last $n$ number of the bistable circuits. Differentiating circuits connected to the outputs of the last $n$ number of bistable circuits detect the directions of reset by the polarities of their output pulses; and they provide simultaneously the outputs for $n$ number of channels in binary-numbered form, which must be decoded into the $n$ separate channels.

The present invention, on the other hand, generates from adjacent phase-pulses a square wave and a sharp-pulsed wave, respectively. Means is required to store the phase of a preceding phase-pulse while the next is being received. The square wave may be generated from either the stored or the incoming wave; and short pulses are generated from the other.

The opposite half-cycles of the square wave provide phase-domains which are used to identify mark (M) and space (S) data-bits, respectively. Hence, a mark or a space is detected according to whether a sharp pulse occurs in a mark or space phase-domain of the square wave.

Where more than one channel is being carried by a received tone, either plural square waves or plural sharp-pulsed waves are formed simultaneously from the stored or the incoming phase pulses. The number of rectangular or sharp-pulsed waves so formed is equal to the number of channels carried by the received tone. The plural waves are phased with each other according to phase-domain relationships among the channels. A coding choice determines the phase relationships among the domans of the respective channels.

With some choices of coding, the phase-domains for a specific type of data-bit (mark or space) in a given channel cannot be represented by a square wave at the frequency of the received tone, but must be represented by a square wave at a multiple frequency of the tone. Optimum coding provides a minimum of such frequency multiplication. Where only one or two channels are carried ona phase-pulsed tone, there is no need for frequency multiplication. However, where the number of encoded channels exceeds two, it becomes necessary to use a higher frequency for a square wave representing the phase-domains for the third and higher order channels. Thus, where three channels are encoded on a tone, a coding choice is available in which the third channel has its mark and space phase-domains represented by a square wave at twice the tone frequency and being properly phased with it.

It is an object of this invention to provide a digital phase-pulse detector that can demodulate a single tone which is modulated simultaneously by one or more independent channels of binary information.

It is another object of this invention to provide a phase-pulse detector which can avoid cross-talk between plural channels carried by a single tone.

It is another object of this invention to provide a phase-pulse detector which is capable of being stable and need require no adjustment after manufacture.

It is still another object of this invention to provide a phase-pulse detector which can be constructed more simply than prior phase-pulse demodulators.

It is a further object of this invention to provide a phase-pulse detector which is operable with received waves having phase errors up to their theoretical-maximum tolerances.

Other objects, features and advantages of this invention will become apparent to one skilled in the art upon further study of the specification and accompanying drawings, in which:

FIGURE 1 represents a form of the invention;

FIGURES 2(A) and (B) show time-domain phasing relationships for a given two channel coding that may be used by the invention;

FIGURES 3 and 4 illustrative wave forms in explaining the invention;

FIGURE 5(A) represents a modification of the embodiment of FIGURE 1;

FIGURES 5(B) and (C) show time-domain phasing relationships usable with FIGURE 5(A);

Figure 1:
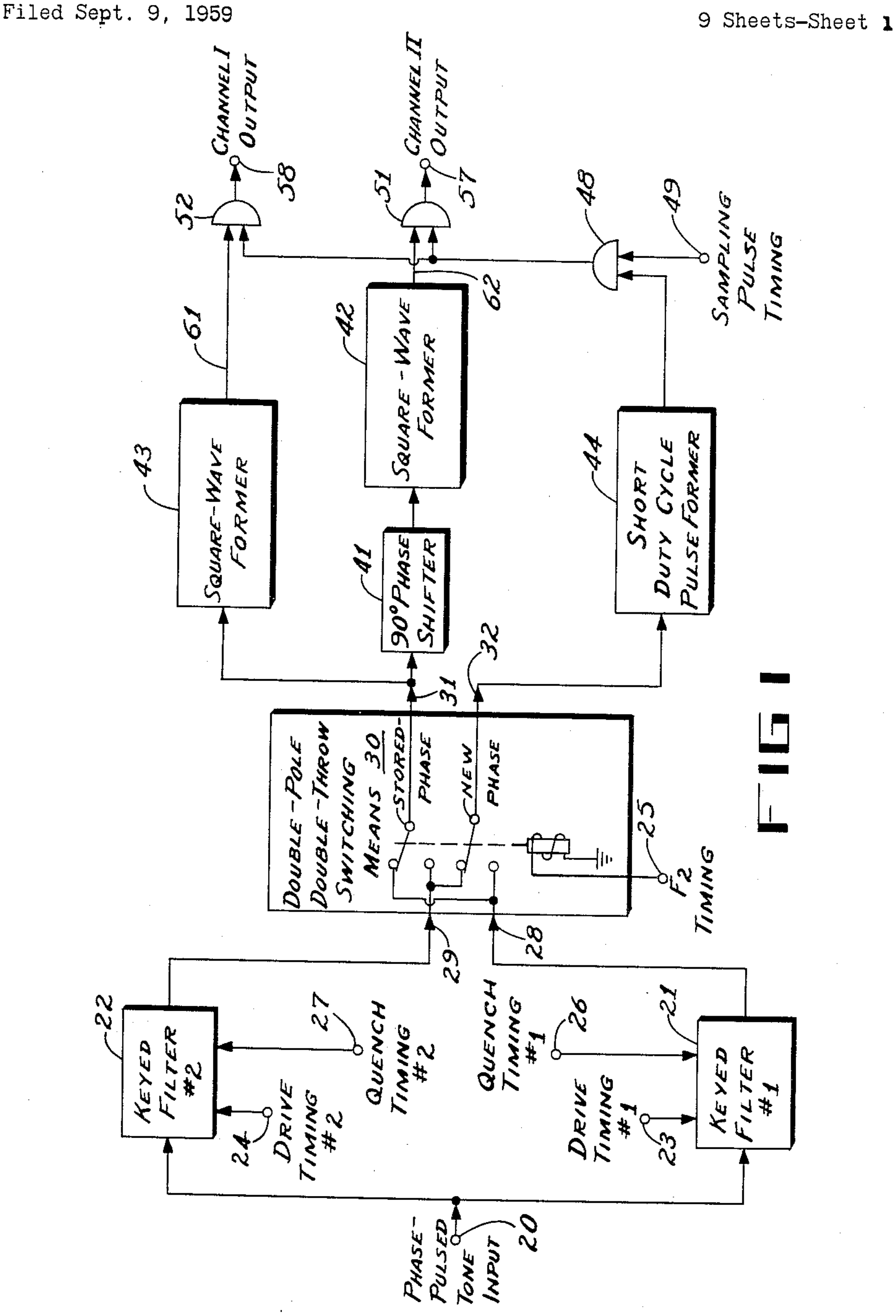

FIGURE 9 diagrammatically illustrates the time-domain phasing relationships for the third channel in a given code choice; and, FIGURES 10(A) and (B) illustrate respective time-domain phasing choices for a single channel per tone.

Phase-pulse modulation has been the subject of other patents and applications such as those given above, and therefore is not treated in detail herein. Briefly, a phase-pulsed signal takes the form shown in FIGURE 3(A); wherein at instances spaced by time-intervals T a phase shift is applied to the wave, with its phase remaining substantially constant between shifts. The phase-shifts occur in discrete amounts which are a function of binary-channel modulation. Theoretically, the modulation may represent simultaneously any number of binary channels. An optimum set of phase shifts is integer multiples of $360/2^n$, where $n$ is the number of binary channels modulated simultaneously on a tone.

For any phase-pulsed system, a coding choice must be made relating binary information of the $n$ channels to the $2^n$ phase-shifts available. Only a finite number of optimum coding choices are available, although there are an infinite number of nonoptimum choices. Only optimum choices are considered in the embodiments herein. For a single channel, only one optimum code is available, and that requires 180° between mark and space types of phase-shifts.

FIGURES 10(A) and (B) both include the single optimum code for a single channel modulated on a tone, but they differ in their choice of domain phasing. They show 0°–180° and 90°–270° choices to respectively represent mark (M) and space (S) information bits. However, an infinite number of phase choices are available to obtain the optimum 180° separation between M and S for a single channel. For example, M and S might be 20°–200° or 25°–205°, etc., and the domain phases will be 110° or 115°, etc. The phase-domains for M and S data bits are different, nevertheless, among these infinite choices.

A phase-domain is the phase range included within boundaries defining a maximum phase-tolerance for any coded phase-shift, with respect to a given channel. A phase-domain, hence, allows for phase errors in a coded phase shift, such as errors caused by the modulator and phase perturbations in propagation.

Hence, in FIGURES 10(A) or (B), a mark can be recognized as long as it falls in the ±90° phase-domain about vector M; and similarly, a space can be recognized as long as it is within the ±90° domain about vector S. Thus 180° phase-domains result for both M and S.

To extend the rationale, if for example, M and S vectors were given at 20°–200° or 25°–205°, the ±90° phase-domains would be about 110°–290° or 115°–285°, respectively.

The position of any phase-domain may be given by the phase of its boundaries with respect to the reference phase 0° of a given code.

Where more than one channel is modulated onto a single tone, the chosen code permits each phase-shift to represent $n$ bits of information, one bit per channel per phase-shift. FIGURES 2(A) and (B) and 5(B) and (C) show like codes for two binary channels modulated on a single wave, because the order of assignment of information bits to phase-shifts is the same in each case. However, FIGURES 2 and 5 have different phase-domains for respective channels.

Each of the four modulation phase-shifts in FIGURES 2 and 5 simultaneously represent two bits of information, one bit from each of independent channels I and II. A mark and space of channel I is represented by $M_1$ and $S_1$. Similarly, a mark and space for channel II is represented by $M_2$ and $S_2$. A particular coding and phase-domain choice must be determined at the transmitter and must be known at the receiver.

Figure 3:
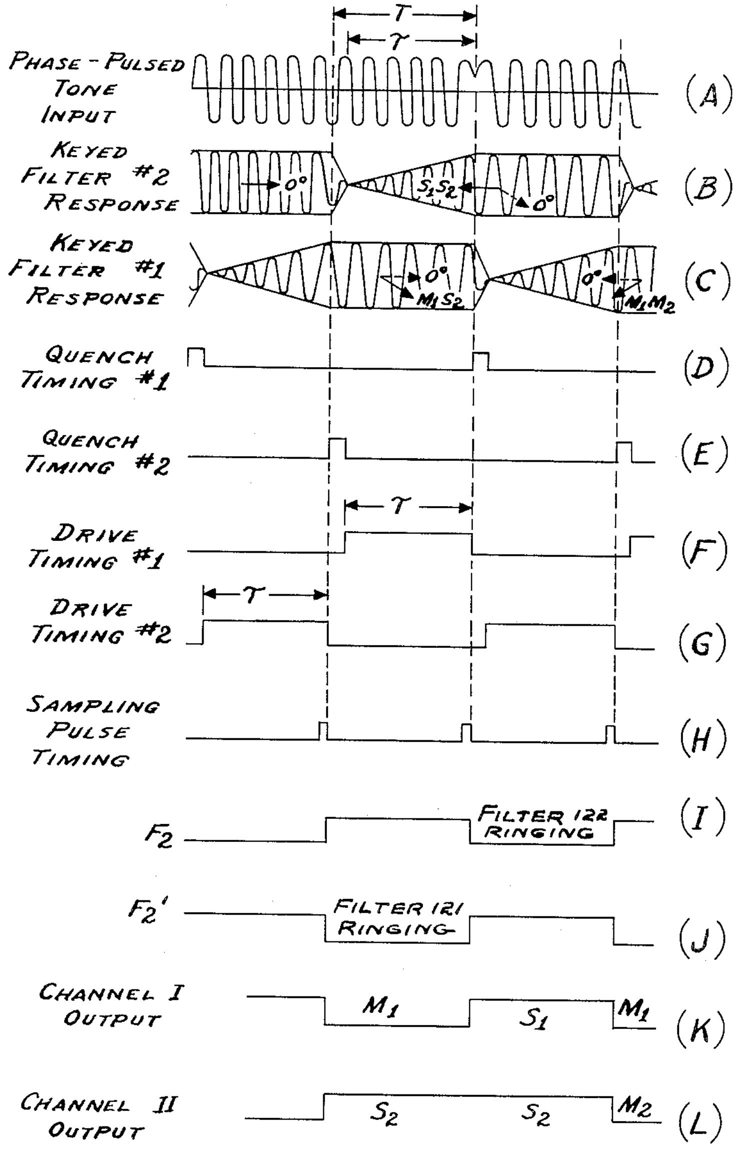

FIGURE 1 shows an embodiment of the invention using the coding and phase-domain relationships shown in FIGURES 2(A) and (B). A phase-pulsed tone modulated synchronously is provided at a terminal 20. The input may be received from a wire line or from a radio receiver, for example. A pair of keyed filters 21 and 22 have inputs connected to terminal 20 to receive the modulated tone. A keyed filter is described in U.S. Patent No. 2,825,808 to Melvin Doelz and Earl T. Heald, entitled, "Keyed Filter" and assigned to the same assignee as the present application. Keyed filter 21 has a pair of timing-input terminals 23 and 26, which are connected to a timing source providing drive-timing and quench-timing signals. In a similar manner, second keyed filter 22 has terminals 24 and 27 also connected to the timing source to receive other driving-timing and quench-ing-timing signals. The drive and quench timing signals are all synchronized with the phase-shifts of the received signal. For example, a pilot tone received with the modulated wave may provide the timing necessary to derive each of the drive and quench signals. FIGURES 3(D), (E), (F), and (G) show the timing relationship of these waves relative to the phase-pulsed signal in FIGURE 3(A), or as taught in U.S. patent application Serial No. 762,801, filed September 23, 1958 and titled, "Phase-Pulse Receiver Synchronization Means."

The keyed filters are extremely high-Q devices tuned to the input tone. They build-up linearly in amplitude at the average phase of the incoming tone during the drive period $\tau$ during which they are enabled. After an enablement period $\tau$, each has its tone input disabled and is permitted to ring at a phase which is the average (integrated) phase of the signal received during enablement. The ringing period following an enablement period represents phase-storage time. The ringing lasts until the next quench pulse is received, which stops the ringing. Since the keyed filters are enabled alternately, they have output responses as shown in FIGURES 3(B) and (C).

The phase of the waves in each keyed filter is sampled near the end of each enablement period of either keyed filter in response to a sampling pulse. A phase comparison is made between these samplings by this invention. Hence, one sampling occurs at the end of a build-up of one filter; which occurs at the end of a ringing period of the other filter.

From FIGURES 3(B) and (C), it can be realized that an alternation occurs between the filters regarding which stores the prior phase-pulse and which has the new phase-pulse. According to the coding illustrated in FIGURES 2(A) and (B), the reference phase 0° always represents the phase of the prior phase-pulse, which is the one stored in the filter that is ringing at a particular time. Hence, the zero-reference phase alternates between the filters at one-half the phase-pulse rate. This alternation of reference is compensated in FIGURE 1 by a double-pole double-throw switching means 30. Switch 30 reverses the connection of its outputs 31 and 32 to its inputs 28 and 29 at the initiation of each phase pulse. Thus, the filter which is ringing (storing the prior phase-pulse) is always connected to output 31; and the filter which is receiving a new phase-pulse is always connected to output 32. The switching reversals are determined by a timing source providing a wave $F_2$ connected to a terminal 25 to provide the switching by the relay shown or by equivalent electronic switches. FIGURE 3(I) illustrates the form of wave $F_2$.

FIGURES 2(A) and (B) illustrate the phase-domains occupied by the two channels coded therein. The phase-domains of each channel can be easily determined from the coding. Thus, in FIGURE 2(A), it is seen that $M_1$ information is carried by both of the 45° and 135° phase-shift vectors because of the coding. Likewise, it is seen that $S_1$ information is carried by the 225° and 315° vectors. Hence, any vector falling in the 0° to 180° range may be interpreted to have $M_1$ information, and this range is designated the $M_1$ phase-domain.

Likewise, the remainder of the phase range from 180° to 0° in a counterclockwise direction can be used to identify any vector having $S_1$ information, and this range is designated the $S_1$ phase-domain.

The same coding analysis applies to $S_2$ and $M_2$ information, and is shown in FIGURE 2(B). It will be found that a vector falling in the 90° to 270° range, in a counterclockwise direction, has $S_2$ information; and therefore, this range is designated as the $S_1$ domain. Similarly, in FIGURE 2(B), the $M_2$ domain is between 270° and 90° in a counterclockwise direction; which is the other half of the figure, since the 315° or 45° vector in this phase-domain contains $M_2$ information.

The two phase-domains in each FIGURE 2(A) and (B) are represented by one-half cycles of square-waves in detailed embodiments of the invention found herein. Thus, a square wave formed from cycles of a stored phase-pulse will have the first one-half of each cycle representing the $M_1$ domain and the last one-half of the cycle representing the $S_1$ domain, as defined for the second channel in FIGURE 2(A).

Similarly, a second square-wave formed from cycles of the same stored phase-pulse, but having its phase retarded by 90° will have the first one-half of each cycle represent the $M_2$ domain and the last one-half cycle represent the $S_2$ domain, as defined in FIGURE 2(B) for the first channel.

In FIGURE 1, a square-wave former 43 has an input connected to terminal 31 and generates a square-wave defining the phase domains of FIGURE 2(A). Furthermore, a −90° phase-shifter 41 and another square-wave former 42 are connected in tandem to terminal 31 to generate a square-wave retarded in phase by 90° to provide the phase-domains of FIGURE 2(B).

The new phase-pulses provided at terminal 32 are supplied to a short duty-cycle pulse former 44, which generates a pulse coincident with a zero-crossing of each cycle of the wave. These pulses have a timing related to the phase-shift of a new phase-pulse relative to the stored phase-pulse. FIGURES 4(B) through (G) illustrate various phasings. Many pulsing circuits are known in the art for generating very short duty cycle pulses from zero-crossings of a wave.

A plurality of "and" gates 48, 51 and 52 have respective inputs connected to the outputs of wave formers 44, 42 and 43. The gates are enabled by a high-level input and are disabled by a low-level input. Another input to "and" gate 48 is connected to a terminal 49, which receives sampling pulses that occur immediately prior to quench pulses supplied to the keyed filters. FIGURE 3(H) illustrates the timing of the sampling pulses in relation to the quench pulses shown in FIGURES 3(D) and (E). The output of "and" gate 48 is connected to other inputs of "and" gates 51 and 52.

Figure 4:
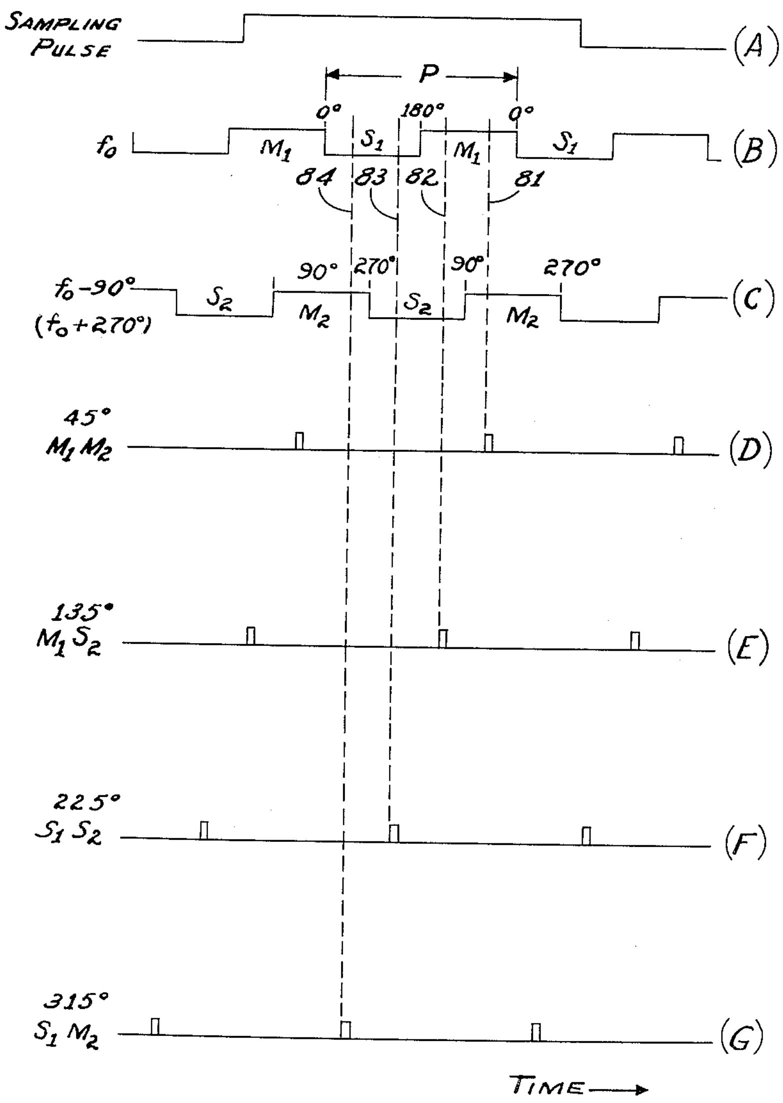

The detection operation of the gates can be observed from FIGURES 4(A–G). FIGURE 4(A) represents a sampling pulse, which has a duration greater than a cycle of the tone frequency, so that at least one pulse from former 44 is passed by it. FIGURES 4(D)–(G) show pulsed waves having the four respective phases of the four phase-shift vectors relative to the reference waves in FIGURES 4(B) and (C). The reference waves are determined by the stored phase-pulse and are the outputs of square-wave formers 43 and 42. Dashed vertical lines 81, 82, 83 and 84 show the relative phasing of each of the four phase-shifts as represented by the timing of the short duty-cycle pulses. The manner in which these vertical lines intersect the square waves in FIGURES 4(B) and (C) illustrates the state of enablement or disablement in which they find gates 51 or 52. It is seen from FIGURE 4(B) that gate 52 is disabled between 0° and 180° (one half cycle) and is enabled between 180° and 0° (adjacent half-cycle). Similarly, it is seen from FIGURE 4(C) that gate 51 is disabled between 270° and 90° (one-half cycle) and is enabled between 90° and 270° (either adjacent half-cycle), with these phases being relative to the reference phase of the wave given in FIGURE 4(B). It is noted from vertical lines 81 and 82 that whenever $M_1$ data occurs, gate 52 is enabled by its square-wave. Likewise, whenever $S_1$ information is obtained, vertical lines 83 and 84 show that gate 52 is disabled by its square wave. Hence, the short-duty-cycle pulses applied to gate 52 will pass through when $M_1$ information is received, and will not pass through when $S_1$ information is received.

On the other hand, whenever $M_2$ information is obtained, it is noted from the intersection of vertical lines 81 and 84 with the wave in FIGURE 4(C) that gate 51 is enabled. Likewise, whenever $S_2$ information is obtained, the intersection of vertical lines 82 and 83 and the wave in FIGURE 4(C) shows that gate 51 is disabled. Hence, the short duty-cycle pulses applied to gate 51 will pass through when $M_2$ information is received, and will be blocked when $S_2$ information is received.

Accordingly, gate 51 will be enabled only during $M_1$ information, and gate 51 will be enabled only during $M_2$ information.

Since the sampling pulse endures longer than a cycle of the tone frequency, at least one pulse from pulse former 44 is given an opportunity to pass through or be blocked by gates 51 and 52. When the sampling pulse has a duration substantially longer than a tone cycle, several pulses may be provided from gate 51 or 52 during a respective mark condition. Where the passage of two or more consecutive pulses is undesirable, one-pulse sampling gates of the type described in application No. 769,456 (cited previously) may be connected to output terminals 57 and 58.

In some cases only a single binary channel will be transmitted on a tone and coded as shown in either FIGURE 10(A) or (B). It is seen that the phase-domains of FIGURES 10(A) and 2(B) are the same. Therefore, gate 51 in FIGURE 1 can detect information transmitted with the phasing of FIGURE 10(B). Likewise the phase-domains of FIGURES 10(B) and 2(A) are the same. Accordingly, gate 52 in FIGURE 1 can detect information having the phasing in FIGURE 2(A). Either square-wave channel in FIGURE 1 may therefore be eliminated to confine it to a single channel system.

Figure 6:
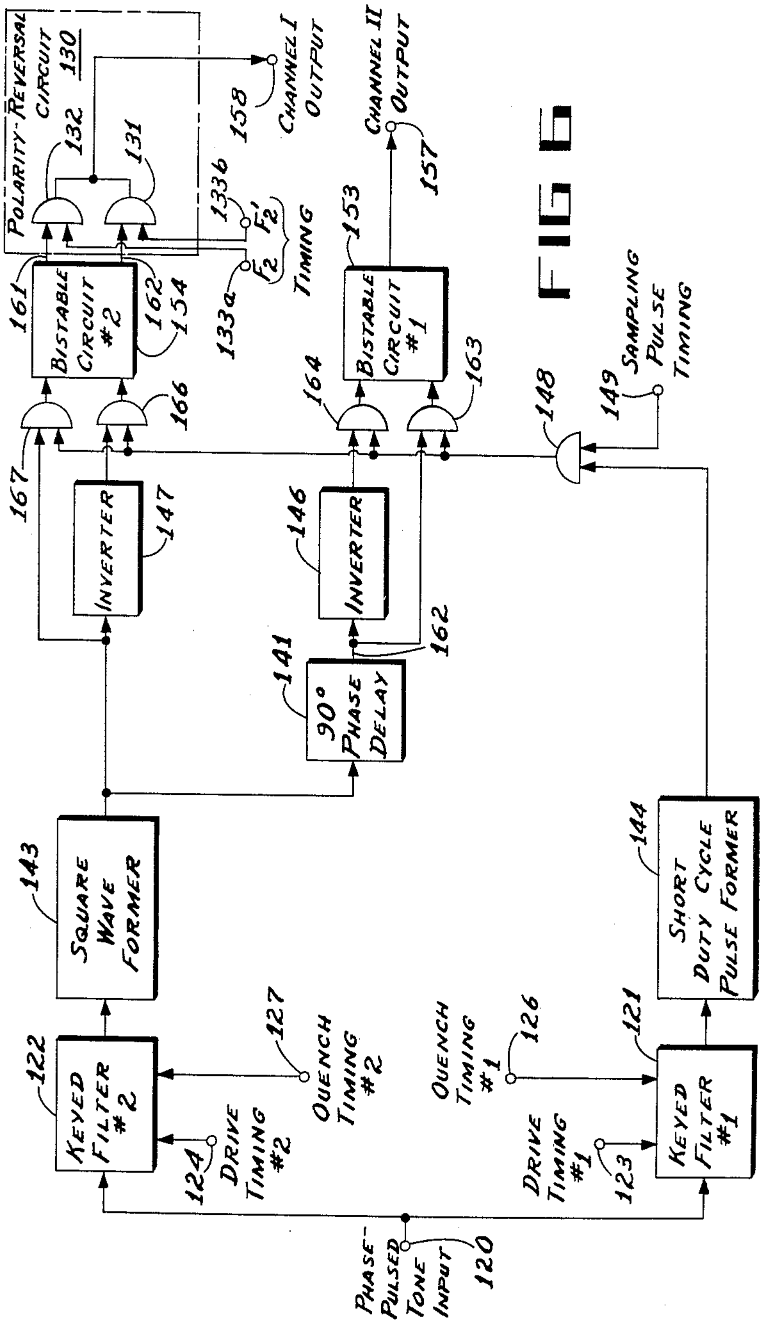
FIGURE 6 shows a modified form of the invention.

FIGURE 6 shows a modified form of the invention, which operates in the same basic manner as given for FIGURE 1, although FIGURE 6 differs in some structural aspects. Hence, the demodulator of FIGURE 6 can detect information having the codes and phase-domains of FIGURES 2(A) and (B) and 10(A) and (B). The keyed filters 121 and 122 may be precisely the same as keyed filters 21 and 22 in FIGURE 1. Likewise, pulse formers 143 and 144 in FIGURE 6 may be the same as pulse formers 43 and 44 in FIGURE 1. In FIGURE 6 a 90° displacement between its two square-wave channels is obtained after formation of a square wave by former 143. A 90° phase shift is obtained by a delay device 141. Thus phase shifter 41 in FIGURE 1 may be a simple RC or LC circuit; but in FIGURE 6 phasing circuit 141 should be a delay component such as a delay line or a delay multivibrator for example.

It should be understood throughout this specification that it makes no difference theoretically whether a phase-shifter such as 41 precedes or follows a square-wave former, since the important thing concerning the basic detection process of the invention is that the square waves applied to the gates have the proper phasing.

However, the detected M and S information provided at terminals 158 and 157 in FIGURE 6 have different direct-current levels rather than the pulse and no-pulse representation provided from terminals 58 and 57 in FIGURE 1.

Two pairs of "and" gates are provided with each square-wave channel in FIGURE 6. Pair 163 and 164 is used for detecting channel II information, while pair 166 and 167 is used for detecting channel I information. Basically, each pair acts in the same manner as one of the gates 51 or 52 in FIGURE 1. However, in FIGURE 6, two gates are used per channel to enable triggering of bistable circuits 153 and 154 to required output levels. Each bistable circuit has a pair of inputs connected to a pair of "and" gate outputs. The trigger-circuit inputs can only be triggered by pulses having a single polarity, such as positive polarity. However, the inputs have selective triggering, that is the output goes to a high level upon triggering one input and goes to a low level upon triggering the other input.

Sampling gate 148 may be identical to gate 48 in FIGURE 1; and its output is connected to each of the gates 163, 164, 166 and 167. However, gates 164 and 166 have inverted square waves of the respective channels applied to them from inverters 146 and 147.

Hence, the gates of each pair will be enabled alternately by the inverted and non-inverted square waves of a given channel; and they will be enabled in different phase-domains. Thus, with respect to FIGURE 2(B), gate 163 is enabled during a 270°–90° phase-domain of $M_2$, and gate 164 is enabled during the opposite 90°–270° phase domain of $S_2$. As a result, bistable circuit 153 is triggered through gate 164 to a high output level, when $S_2$ information is received, and is triggered through gate 163 to a low output level when $M_2$ information is received to provide channel II information at terminal 157. Likewise, bistable circuit 154 is triggered to high and low output levels by the respective outputs of gates 167 and 166 to provide channel I information at its output.

However, an alternate ambiguity occurs in the channel I output of bistable circuit 154, due to the fact that a double-pole switching means similar to item 30 in FIGURE 1 is not provided at the keyed filter outputs in FIGURE 6. The alternating ambiguity is caused by the alternate shifting of the zero-reference phase between the keyed filters. Thus, the zero-reference phase shifts alternately to the sharp-pulsed channel at one time, and to the square-wave channels the next time. In effect, vector positions of the zero-reference vector and the received phase-shift vector are alternately reversed in FIGURES 2(A) and (B). For example, in FIGURE 2(A), consider the vector $M_1M_2$ to represent a newly received phase-pulse and that it is being received by filter 122. Hence, it provides the square waves. Then keyed filter 121 and the short duty-cycle wave provides the zero-reference phase of the stored phase pulse. Consequently, the $M_1M_2$ vector appears to act as the reference; and therefore, a leading 315° relationship appears instead of the actual leading 45° coded relationship. The 315° vector falls in the $S_1$ domain rather than the $M_1$ domain, and an error results in channel I only. No error results in channel II because both the 45° and 315° vector fall in the same phase-domain.

However, the ambiguity of channel I is always known and can be corrected easily. All that need be done is to reverse the output level of channel I whenever its keyed filter 122 is receiving a new phase-pulse. A timing wave $F_2$ is used for this purpose. It is a square wave at one-half the phase-pulse rate so that it is at a low level when filter 122 is ringing with a prior phase-pulse, and is at a high level when filter 122 is receiving a new phase-pulse. An opposite phase-timing wave $F'_2$ is also generated. FIGURES 3(I) and (J) illustrate the opposite-phase relationship between $F_2$ and $F'_2$. Waves $F_2$ and $F'_2$ are provided to a polarity-reversing circuit 130, which comprises a pair of "and" gates 131 and 132 that have respective inputs connected to opposite-level outputs 161 and 162 of bistable circuit 154. Gate terminals 133*a* and 133*b* receive timing waves $F_2$ and $F'_2$. The outputs of gates 131 and 132 are connected in common to terminal 158 to provide the corrected channel I output.

Figure 7:
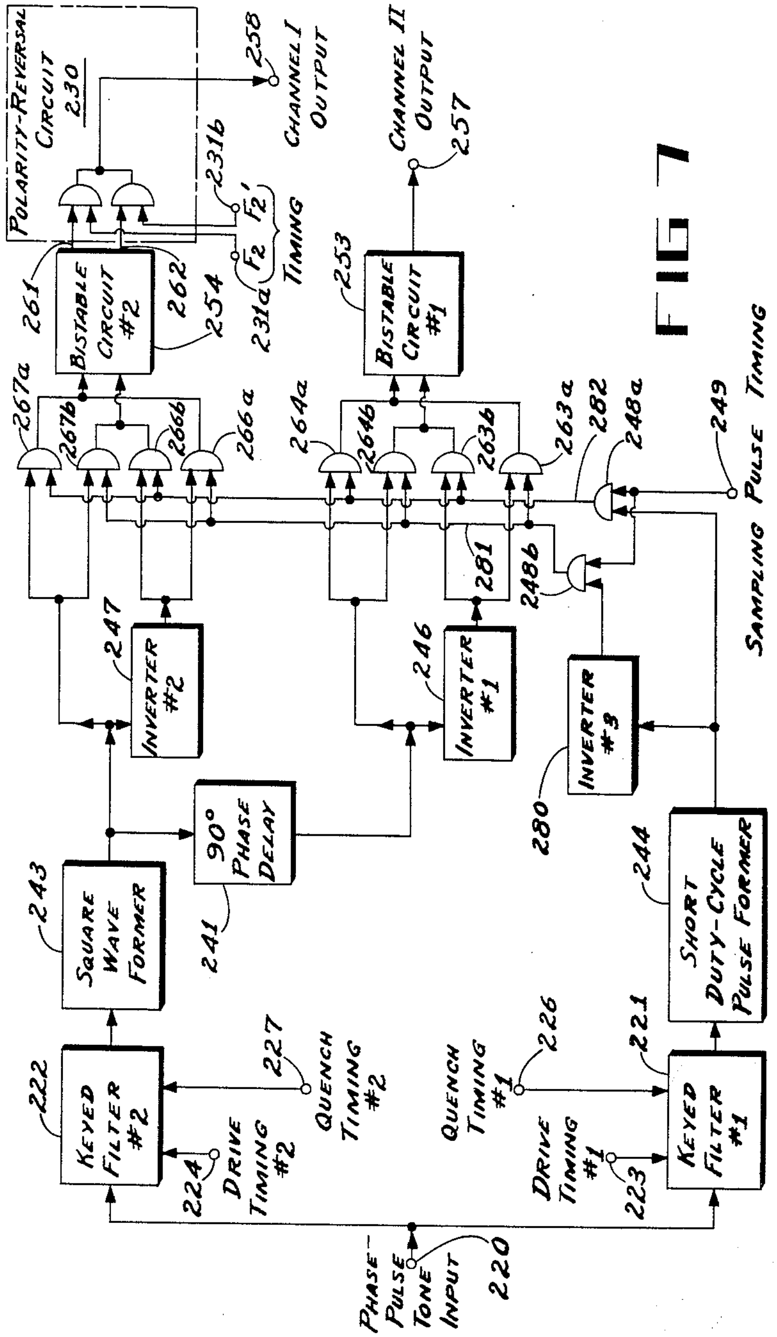
FIGURE 7 shows still another form of the invention.

FIGURE 7 provides an addition to the form of the invention in FIGURE 6 to increase the response speed of the system by allowing the duration of the sampling pulses to be reduced to between one-half and a whole period of the tone frequency. In effect, sampling response will be approximately twice as fast as that found in the embodiments of FIGURES 1 and 6. The same items are shown in FIGURE 7 as were shown in FIGURE 6, except additional "and" gates and an additional inverter 280 are provided in FIGURE 7.

Pulse former 244 generates two pulses per cycle; a positive pulse on a positive-going zero crossing and a negative pulse on a negative-going zero crossing. This can be identical to the operation of pulse formers 44 and 144 in the prior circuits since they can disregard the negative pulses.

Inverter 280 is connected to the output of pulse former 244. Gates 248*a* and *b* receive the inverted and non-inverted pulses. The inverted output of gate 248*b* is provided to a lead 281, which is connected to inputs of "and" gates 263*a*, 264*b*, 266*a*, and 267*b*. The non-inverted output of gate 248*a* is provided by a lead 282 to inputs of gates 263*b*, 264*a*, 266*b* and 267*a*. All of these gates are enabled only by positive pulsed inputs.

The channel II noninverted square wave is provided to inputs of gates 264*a* and *b*. And the channel II inverted square wave is provided to inputs of gates 263*a* and *b*. In a like manner, gates 266*a* and *b* receive the inverted channel I square wave, and the non-inverted channel I square wave is applied to "and" gates 267*a* and *b*.

Accordingly, one input to bistable 253 is connected in common to the outputs of gates 263*a* and 264*a*; while the opposite input of circuit 253 is connected to gates 263*b* and 264*b*. Similarly, opposite inputs to bistable circuit 254 are connected on the one hand to gates 266*a* and 267*a* and, on the other hand, to gates 266*b* and 267*b*.

The double pairs of gates in FIGURE 7 in effect provide two sets of gates like those shown in FIGURE 6. However, one set of gates is only capable of operating with the positive pulses from former 244 and the other set of gates can only operate with the inverted-negative pulses from former 244. Due to their arrangement, however, the triggering of the bistable circuits is the same for a given input phase-shift regardless of which set of "and" gates operates. Which set operates with a given input phase-shift will depend upon whether the output of keyed filter 221 first goes through a positive or a negative zero crossing after the beginning of a sampling pulse. Hence, less jitter will occur in the timing of the data outputs in FIGURE 7 than in FIGURES 1 or 6.

FIGURES 5(B) and (C) illustrate the same phase-shift code given in FIGURES 2(A) and (B). The coding is the same because a 90° phase difference exists between modulation phase-shifts, and they are labeled with information bits in the same order. However, different phase-domains are provided in FIGURES 5(B) and (C). In FIGURE 5, the $M_1M_2$ phase-shift is at 0° and coincides with the reference phase; while in FIGURE 2, the $M_1M_2$ phase-shift is at +45°. Such changes can be accomplished with nothing more than a change in the relative phases of the square waves.

FIGURE 5(C) illustrates the $M_1$ and $S_1$ domain for channel I which have domain boundaries along a dashed line at 135°–315°. Likewise, FIGURE 5(B) illustrates the channel II domains for $S_2$ and $M_2$; wherein their phase boundary is along the dashed line at 45°–225°.

FIGURE 5(A) illustrates a circuit for detecting information having the phase-domains illustrated in FIGURES 5(B) and (C). The ease with which the invention can be adapted to changes in phase-domain with a given coding thus will become evident.

Figure 8:
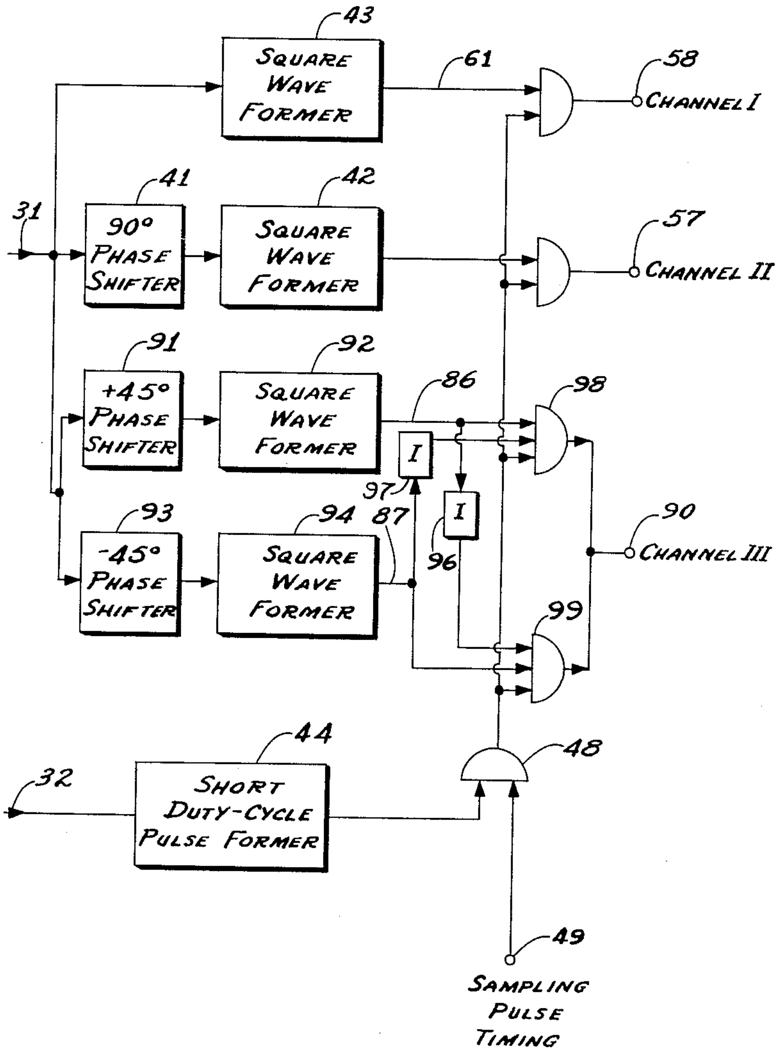
FIGURE 8 illustrates another modified form of the invention to detect three channels carried by a single tone.

Leads 31 and 32 in FIGURE 8 are the same as like-numbered leads in FIGURE 1; and it is presumed that the preceding structure in FIGURE 1 is incorporated into FIGURE 5(A). The remaining structure shown in FIGURE 5(A) may also be identical to that shown in FIGURE 1, with the exception of phase-shifters 41*a* and 41*b*, which are connected respectively in tandem with square-wave formers 42 and 43 and lead 31. Phase shifter 41*a* provides a 45° leading phase-shift to obtain the phase-domain shown in FIGURE 5(B) for channel I. On the other hand, phase shifter 41*b* provides a 45° lagging phase-shift to obtain the phase-domains for channel II, as shown in FIGURE 5(C). Otherwise, the operating of the system in FIGURE 5(A) is precisely the same as that explained in connection with FIGURE 1.

It will become obvious by rationalizing from FIGURES 1, 2, and 5 that phase-domain variation is simply controlled in the invention by choice of phase-shifts for the square-wave channels.

FIGURE 8 illustrates how additions may be made to the system of FIGURE 1 (or to FIGURES 6 or 7) to detect three channels modulated simultaneously onto a single incoming tone.

The modulation for three channels may be encoded onto a phase-pulsed wave by the phase-shifts shown in FIGURE 9, where each of eight phase-shifts have three information bits as illustrated. The reference vector 0° is the same in FIGURE 9 as it was in FIGURES 2 and 10, and represents the phase of the wave prior to a given phase-shift. The eight phase shifts are spaced by 45° increments from 22½° to 337½°.

The particular coding choice in FIGURE 9 provides the same phase-domains for channels I and II as were given in FIGURES 2(B) and (A), respectively. Thus, only the phase-domains for an added channel III are given in FIGURE 9, and it is noted that four phase domains are required for it. The $M_3$ domain is from 45° to 133° and 225° to 315°, both counterclockwise. On the other hand, the $S_3$ domain is from 135°–225° and from 315°–45°, counterclockwise. These four domains imply two square-wave cycles in the place of one cycle in channels I and II. It is obtained by a square wave at double frequency.

Leads 31 and 32 in FIGURE 8 are precisely the same as in FIGURE 1, and it is presumed that the preceding structure in FIGURE 1 is incorporated into FIGURE 8. Also the 0° and 90° square waves for channels I and II are the same in both figures.

Accordingly, there is added in FIGURE 8, a third channel comprising means for generating an effective square wave at twice the rate of the square waves of channels I and II and phase displacing it by 45°. This may be done by direct ×2 frequency multiplication, wave squaring and 45° phase shifting.

However, a less direct manner is used in FIGURE 8 that nevertheless accomplishes the same purpose. In FIGURE 8, the third channel includes a pair of phase shifters 91 and 93 which have inputs connected to lead 31. They provide phase-shifts that are +45° and −45°, although any different integral amounts of 45° will do. A pair of "and" gates 98 and 99 are provided in FIGURE 8; and each has an input connected to an output of gate 48. The coincidence functions of gates 98 and 99 with respect to their square-wave inputs and their common output terminal 90 provide an effective ×2 multiplication of the square-wave rate with respect to the combined outputs of the gates. Hence, gate 98 has a pair of inputs connected directly to formers 92 and 94 to obtain coincidence once per cycle during the 45°–135° $M_3$-domain illustrated in FIGURE 9. Further, gate 99 has a pair of inputs connected through inverters 96 and 97 to formers 92 and 94 to obtain coincidence during the 225°–315° $M_2$-domain. Hence, the combined output effect of both gates is enablement from 45° to 135° and from 225° to 315° which is an effective square wave at twice the tone frequency and shifted by 45°.

During a sampling pulse, at least one of the sharp-pulses from former 44 is provided an opportunity to be passed or blocked by one of the gates 98 or 99, depending on whether they are in an $M_3$-domain of enablement, or in an $S_3$-domain of disablement. Hence, the information is provided at terminal 90 in the form of pulse or no pulse to represent mark or space, as is obtained from the output terminals in FIGURE 1.

Output shaping bistable circuits may be added to terminal 90 of FIGURE 9 in the same manner as was done to the other terminals in either FIGURE 6 or FIGURE 7, by adding gate pairs and inverters.

From the previously described plural forms of the invention, it will be understood by those in the art how the invention may be generalized to apply any choice of phase-domains with any assigned code and how the structure of the invention may be constructed to detect a particular choice of code and phase-domains.

Basically, the invention detects correspondence between assigned phase-domains and discrete phase-shifts. Consequently, the invention can be applied to any preassigned system of phase-domains; and such domains can always be defined by rectangular waves, with each phase-domain being defined by the duty-cycle and phasing of a rectangular wave.

Hence, the invention can use other codings than the simultaneous-multiplexed codings described above for a set of phase-shifts. Simple time-multiplexed coding is another example, and represents the assignment of an exclusive phase-domain for each phase shift, rather than the overlapping phase-domains of simultaneous-multiplexing. The exclusive phase-domains with simple time-multiplexing result from each phase-shift representing only one information bit. A basic disadvantage of time-multiplexed coding is that it takes much more transmission-bandwidth for a given information-rate and signal-to-noise ratio than simultaneous-multiplexed coding. Hence, the simultaneous-multiplexed forms of the invention are preferred in most situations.

For example, the phase-shifts shown in FIGURE 2(A) can be coded to represent two time-multiplexed channels. In such case, each of the four illustrated phase-shifts would represent one mark or space from each of two channels, such as $M_1$ at 45°, $S_1$ at 135°, $M_2$ at 225° and $S_2$ at 315°; and each is then centered in an exclusive 90° phase-domain. As another example, the eight phase-shifts illustrated in FIGURE 9 can represent four time-multiplexed channels, such as by the following code: $M_1$ at 22½°, $S_1$ at 67½°, $M_2$ at 112½°, $S_2$ at 157½°, $M_3$ at 202½°, $S_3$ at 247½°, $M_4$ at 232½°, and $S_4$ at 337½°; and each phase-shift is centered in an exclusive phase-domain of 45°.

Hence, simple time-multiplexing uses $2^n$ discrete phase-shifts to code the respective marks and spaces of $n$ binary channels. Optimum time-multiplexed coding requires equally-spaced phase-shifts. Thus, each of such phase-shifts is centered in an exclusive phase-domain of $360°/2^n$. The $2^n$ phase-domains can be provided by $2^n$ rectangular waves, phased with the respective phase-domains periods. Rectangular wave formers are well known in the art. Respective coincidence gates like those shown in the above figures can in the same manner determine the phase-domain for each received phase-shift in a time-multiplexed code as above-described for simultaneously-coded systems. As a result, the coincidence gates are respective distributors of the information of the separate time-multiplexed channels.

Thus, with the above example of two-channel time-multiplexed coding, the circuit of FIGURE 7 may be easily modified by changing square-wave former 243 to a 90° rectangular wave former; and by substituting for inverter 247, delay circuit 241, and inverter 246, a 90° phase delay circuit, a 180° phase delay circuit and another 90° phase delay circuit, respectively.

Although this invention has been described with respect to particular embodiments thereof, it is not to be so limited as changes and modifications may be made therein, which are within the full intended scope of the invention as defined by the appended claims.

I claim:

1. Means for detecting data modulated as phase-pulses onto a carrier frequency by synchronous phase-shifts of it, there being plural discrete phase-shifts coded with $n$ number of channels of digital data comprising, means for receiving each of said phase-pulses, means for storing the phase of each received phase pulse for at least a period of a following phase-pulse, means for forming a rectangular wave from either said received or said stored phase pulses, means for forming short duty-cycle pulses from the other of said received or stored phase pulses, a time domain of one of said phase shifts being occupied by one level of said square wave, and coincidence means for time comparing said short duty-cycle pulses and said rectangular wave to detect said one phase shift by time coincidence between said short duty-cycle pulses and said one level of said rectangular wave.

2. Means for detecting data modulated as phase-pulses onto a carrier frequency by synchronous phase-shifts of it, there being plural discrete phase-shifts coded with *n* number of channels of digital data comprising, means for receiving said phase-pulses, a pair of keyed-filters receiving alternate phase-pulses, and each keyed-filter storing the phase of its received phase-pulses for a following pulse period, means for forming pulses having a short duty-cycle and being connected to the output of one of said keyed filters, means for forming at least one rectangular wave being connected to the output of the other of said keyed filters, means for comparing the amplitude level of said rectangular wave with said short duty-cycle pulses, a particular data bit being provided by time coincidence between said pulses and one amplitude level of said rectangular wave.

3. Means for detecting data modulated as phase-pulses onto a carrier frequency by synchronous phase-shifts of it, different phase-shifts representing different mark and space data bits, comprising means for receiving each phase-pulse, a pair of keyed filters receiving alternate phase-pulses, and each keyed filter storing the phase of its received phase-pulses for a following phase-pulse period, means for forming pulses having a very short duty-cycle being connected to the output of one of said keyed filters, means for forming a square-wave being connected to the output of the other of said keyed filters, means for comparing the levels of said square wave with the timing of said short duty-cycle pulses, a mark being detected by coincidence of said pulse with one level of said square wave, and a space being detected by coincidence of said pulse with an opposite level of said square wave.

4. Means for detecting data modulated as phase-pulses onto a frequency by synchronous phase-shifts of it, there being two phase-shifts coded 180° from each other, one phase-shift representing a mark and the other representing a space, comprising means for receiving said phase-pulses, a pair of keyed filters receiving alternate phase-pulses, and each keyed filter storing the phase of each received phase-pulse for a following phase-pulse period, means for forming short duty-cycle pulses being connected to the output of one of said keyed filters, means for forming a square wave being connected to the output of the other of said keyed filters, phase-shift means for providing a code-related phase difference to either said square wave or said short duty-cycle pulses, means for comparing the levels of said square-wave with the timing of said short duty-cycle pulses, mark data being detected by time coincidence between said pulses and one level of said square-wave, and space data being provided by time coincidence between said pulses and the opposite level of said square wave.

5. Means for detecting data modulated as phase-pulses onto a carrier wave by synchronous phase-shifts of it, there being up to $2^n$ discrete phase-shifts for *n* number of channels of binary data, a given data-coding assigning *n* data bits to each phase-shift, and *n* number of phase-domains of said coding being respectively phased with respect to said phase-shifts, comprising means for receiving each of said phase pulses, means for storing the phase of a prior received phase-pulse, means for forming *n* number of square-waves from said stored phase-pulses or from instantly received phase-pulses, means for forming short duty-cycle pulses from the other of said instantly received or said stored phase-pulses, means for phase displacing said square waves from each other by amounts equal to the phasing of said domains, plural amplitude-level comparator means for respectively comparing the short duty-cycle pulses with the levels of said square waves, respective outputs of said comparator means providing separate detection of the respective *n* number of channels.

6. Means for detecting data as defined in claim 5, *n* being two, and the phase-domains being 180° each, with respective boundaries at 0° and 90° relative to the phase of a prior phase-pulse.

7. Means for detecting data as defined in claim 5, in which *n* is two, said phase-shifts being odd integer multiples of 45°, and means for phase shifting said square waves by 0° and 90° respectively.

8. Means for detecting data as defined in claim 5 in which said discrete phase shifts are even integers of 45°, and means for phase shifting said square waves by different odd integer values of 45° to accommodate the different phase-domains for the two channels.

9. Means for detecting data modulated phase-pulse into a carrier frequency by synchronous phase-shifts of it, there being four types of discrete phase-shifts of 45°, 135°, 225° and 315°, a given data coding being assigned to said phase-shifts to include two simultaneous channels of data, comprising a pair of keyed-filters receiving alternate phase-pulses of said frequency, a short duty-cycle pulse former being connected to the output of one of said keyed filters, a square-wave former being connected to the output of the other of said keyed filters to provide a first square-wave in phase with the keyed-filter output, means for providing another square wave phase-shifted by 90° from said first square-wave, a sampling gate having one input connected to the output of said short duty-cycle pulse-former, a sampling pulse source being connected to an input of said sampling gate, said sampling gate pulses being timed with ends of said phase-pulses, a pair of amplitude-comparator gates, each having an input connected to an output of said sampling gate, an input of one of said comparator gates receiving said first square-wave, an input of the other of said comparator gates receiving said 90° phase-shifted square wave, and the outputs of said comparator gates providing detected information of the respective channels.

10. Means for detecting data as defined in claim 9 including double-pole, double-throw switching means connected between outputs of said keyed-filters and inputs of said square-wave former, alternate phase-pulse timing means being connected to said switching means, input connections of said switching means being alternately reversed between said keyed-filter outputs by said timing means.

11. Means for detecting data as defined in claim 9, in which a pair of bistable circuits have inputs respectively connected to the outputs of said comparator gates, a polarity-reversal circuit being connected to the output of one of said bistable circuits, said one bistable circuit being connected to the comparator gate receiving said first square-wave, an alternate phase-pulse timing source connected to said polarity-reversal circuit to alternately choose opposite outputs of said one bistable circuit as a data output of one of said channels, the other bistable circuit providing a data output for the other channel.

12. Means for detecting data modulated as face-pulses onto a carrier frequency by synchronous phase-shifts of it, there being up to $2^n$ discrete phase shifts, where *n* is the number of channels of data being simultaneously modulated, a given data-coding being assigned to said phase-shifts, comprising a pair of keyed-filters receiving alternate phase pulses, a short duty-cycle pulse-former connected to an output of one of said keyed filters, a sampling gate means having an input connected to an output of said short duty-cycle pulse-former, a sampling pulse source connected to another input of said sampling gate, at least one square-wave pulse-former connected to an output of the other of said keyed-filters, at least plural comparator gate means, an output of said sampling gate means connected to an input of each of said comparator gate means, one of the first pair of said comparator gate means having another input connected to an output of said square-wave former, and phase-delay means connected between said square-wave former and the other comparator-gate means to phase delay it according to said data coding.

13. A detector means as defined in claim 12 in which each of said comparator gate means includes a pair of "and" gates, an input of each pair being connected to an output of said sampling gate means, and another input of each pair being connected to said phase-delay means for inverting a square-wave input to one "and" gate in each pair, a plurality of bistable circuits, each having a pair of inputs respectively connected to outputs of a respective pair of "and" gates, an output from each bistable circuit providing a detected data channel.

14. A data detection means as defined in claim 12 adapted to detect at least two channels of data having means providing square-waves to a pair of comparator gates phase-displaced from each other by 90°, another comparator gate means providing a double frequency square-wave to said another comparator gate means, phase-shifted by 45° from said other square waves, the output of said another comparator gate means providing a third detected channel.

15. A phase-pulse detector as defined in claim 14 capable of detecting at least three channels of data simultaneously encoded with eight discrete phase-shifts, in which said another comparator-gate means comprises first and second additional "and" gates, each having at least three inputs, means for providing third and fourth square-waves phase-shifted by different integer values of 45° from said a square-wave of said square-wave former, respective inputs of said additional "and" gates receiving respectively said third and fourth square-waves, means for inverting said third and fourth square-waves and applying them to other respective inputs of said additional "and" gates, and another input of each of said additional "and" gates being connected to an output of said sampling-gate means, and outputs of said additional "and" gates being connected in common to provide a third detected channel.

References Cited in the file of this patent

UNITED STATES PATENTS 2,904,683 Meyer ---------------- Sept. 15, 1959